(12) United States Patent
Igarashi (10) Patent No.: US 7,997,794 B2
(45) Date of Patent: Aug. 16, 2011

(54) TEMPERATURE SENSOR CIRCUIT (75) Inventor: Atsushi Igarashi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 549 days.

(21) Appl. No.: 11/842,566

(22) Filed: Aug. 21, 2007

(65) Prior Publication Data

US 2008/0285624 A1 Nov. 20, 2008

(30) Foreign Application Priority Data

Aug. 29, 2006 (JP) ................................. 2006-232193

(51) Int. Cl.
*G01K 7/00* (2006.01)
(52) U.S. Cl. ......... 374/178; 374/170; 327/513; 327/483
(58) Field of Classification Search .......... 374/170–173, 374/178, 141, 163, 183; 702/130–136; 327/512–513, 575, 483; 257/378, 470
See application file for complete search history.

(56) References Cited

U.S. PATENT DOCUMENTS

| | | | | |
|---|---|---|---|---|
| 3,258,606 | A * | 6/1966 | Meadows | 327/512 |
| 3,488,529 | A * | 1/1970 | Howe | 327/512 |
| 3,560,948 | A * | 2/1971 | Inose et al. | 340/870.42 |
| 3,668,541 | A * | 6/1972 | Pease | 330/289 |
| 3,809,928 | A * | 5/1974 | Evans | 327/513 |
| 3,979,688 | A * | 9/1976 | Maidique | 330/261 |
| 4,024,462 | A * | 5/1977 | Highnote et al. | 330/259 |
| 4,331,888 | A * | 5/1982 | Yamauchi | 340/598 |
| 4,639,755 | A * | 1/1987 | Namiki et al. | 327/512 |
| 4,652,144 | A * | 3/1987 | Gunther et al. | 327/512 |
| 4,958,090 | A * | 9/1990 | Jansson | 326/128 |
| 5,039,878 | A * | 8/1991 | Armstrong et al. | 327/512 |
| 5,140,181 | A * | 8/1992 | Yoshino | 327/542 |
| 5,213,416 | A * | 5/1993 | Neely et al. | 374/178 |
| 5,414,383 | A * | 5/1995 | Cusdin et al. | 329/304 |
| 5,489,861 | A * | 2/1996 | Seymour | 327/108 |
| 5,539,302 | A * | 7/1996 | Takimoto et al. | 323/315 |
| 5,604,466 | A * | 2/1997 | Dreps et al. | 331/113 R |
| 5,719,533 | A * | 2/1998 | Shibuya et al. | 331/176 |
| 5,859,568 | A * | 1/1999 | Le et al. | 330/289 |
| 6,046,492 | A * | 4/2000 | Machida et al. | 257/567 |
| 6,468,825 | B1 * | 10/2002 | Machida et al. | 438/48 |
| 6,733,174 | B2 * | 5/2004 | Matsumoto et al. | 374/178 |
| 6,825,709 | B2 * | 11/2004 | Motz | 327/513 |
| 7,011,444 | B2 * | 3/2006 | Mayusumi et al. | 374/112 |
| 7,400,208 | B2 * | 7/2008 | Yoshikawa | 331/176 |
| 7,901,134 | B2 * | 3/2011 | Sudo | 374/173 |
| 2003/0155977 | A1 * | 8/2003 | Johnson et al. | 330/290 |
| 2003/0184327 | A1 * | 10/2003 | Makino | 324/721 |
| 2004/0124908 | A1 * | 7/2004 | Lei | 327/538 |

(Continued)

FOREIGN PATENT DOCUMENTS

JP 57099789 A * 6/1982

(Continued)

*Primary Examiner* — Gail Verbitsky (74) *Attorney, Agent, or Firm* — Brinks Hofer Gilson & Lione (57) ABSTRACT

A temperature sensor circuit whose output voltage has high precision is provided. The temperature sensor circuit includes a Darlington circuit having bipolar transistors, a constant current circuit, and a current control circuit. Emitter currents of the bipolar transistors are made equal to one another by the constant current circuit. Base currents corresponding to the emitter currents of the respective bipolar transistors are sunk by the current control circuit.

9 Claims, 6 Drawing Sheets

U.S. PATENT DOCUMENTS

| | | | |
|---|---|---|---|
| 2008/0129380 A1* | 6/2008 | Jin | 330/250 |
| 2008/0198899 A1* | 8/2008 | Igarashi | 374/163 |
| 2008/0285624 A1* | 11/2008 | Igarashi | 374/178 |
| 2009/0059997 A1* | 3/2009 | Sudo | 374/173 |
| 2009/0153227 A1* | 6/2009 | Ooe et al. | 327/512 |
| 2009/0294870 A1* | 12/2009 | Arai et al. | 257/378 |

FOREIGN PATENT DOCUMENTS

| | | | |
|---|---|---|---|
| JP | 61067232 A | * | 4/1986 |
| JP | 5-248962 A | | 9/1993 |

* cited by examiner

PRIOR ART

TEMPERATURE SENSOR CIRCUIT

This application claims priority under 35 U.S.C. §119 to Japanese Patent Application No. JP2006-232193 filed Aug. 29, 2006, the entire content of which is hereby incorporated by reference.

BACKGROUND OF THE INVENTION

1. Field of the Invention

The present invention relates to a temperature sensor circuit.

2. Description of the Related Art

Figure 6:
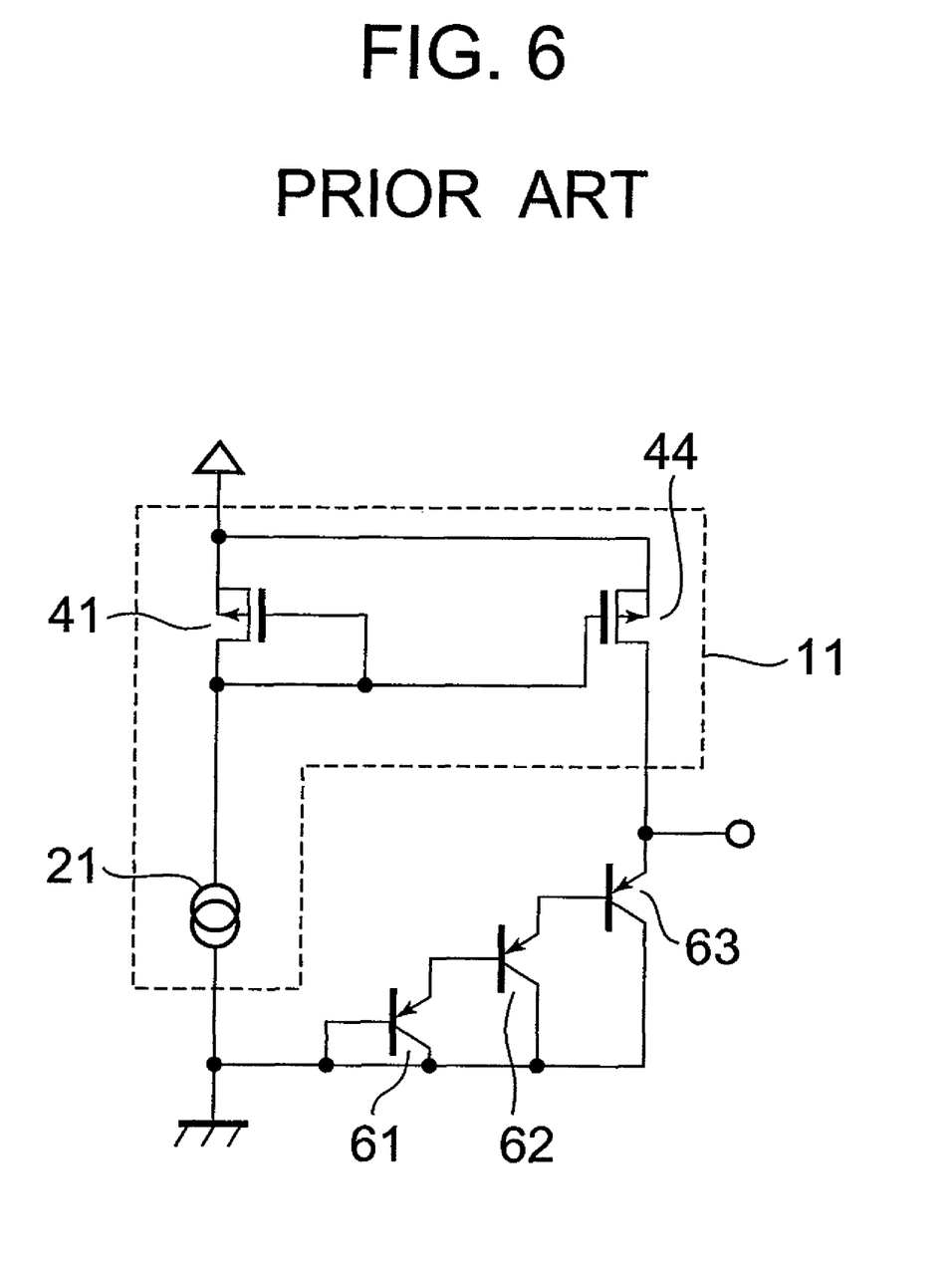
FIG. 6 is a schematic diagram showing the conventional temperature sensor circuit.

A conventional temperature sensor circuit will be described. FIG. 6 is a schematic diagram showing the conventional temperature sensor circuit.

The temperature sensor circuit includes a constant current circuit 11 and a Darlington circuit. The constant current circuit 11 includes a constant current source 21 and a current mirror circuit composed of MOS transistors 41 and 44 having the same size. The Darlington circuit includes bipolar transistors 61 to 63 having the same size. An output terminal of the constant current circuit 11 is connected with an emitter of the bipolar transistor 63 of the Darlington circuit.

According to the temperature sensor circuit, base-emitter voltages of the bipolar transistors 61 to 63 vary with a temperature and an output voltage of the temperature sensor circuit also varies correspondingly. The temperature is detected based on the output voltage (see, for example, JP 05-248962 A).

However, there are manufacturing variations in current gains of the plurality of bipolar transistors of the Darlington circuit, so emitter currents vary. Therefore, the base-emitter voltages of the bipolar transistors vary, so the output voltage of the temperature sensor circuit varies to reduce the precision thereof.

SUMMARY OF THE INVENTION

The present invention has been made in view of the above-mentioned point. An object of the present invention is to provide a temperature sensor circuit whose output voltage has high precision.

According to the present invention, to solve the above-mentioned problem, there is provided a temperature sensor circuit. The temperature sensor circuit includes:

a Darlington circuit including a plurality of transistors;

a constant current circuit for supplying a current to the Darlington circuit; and a current control circuit for making emitter currents of the plurality of transistors equal to each other.

According to the present invention, emitter currents of the plurality of transistors are made equal to one another by the current control circuit, so variations in emitter currents of the plurality of transistors are eliminated. Therefore, variations in base-emitter voltages of the transistors are suppressed, with the result that the precision of the output voltage of the temperature sensor circuit becomes higher.

DETAILED DESCRIPTION OF THE PREFERRED EMBODIMENTS

Hereinafter, embodiments of the present invention will be described in detail with reference to the accompanying drawings.

First Embodiment

Figure 1:
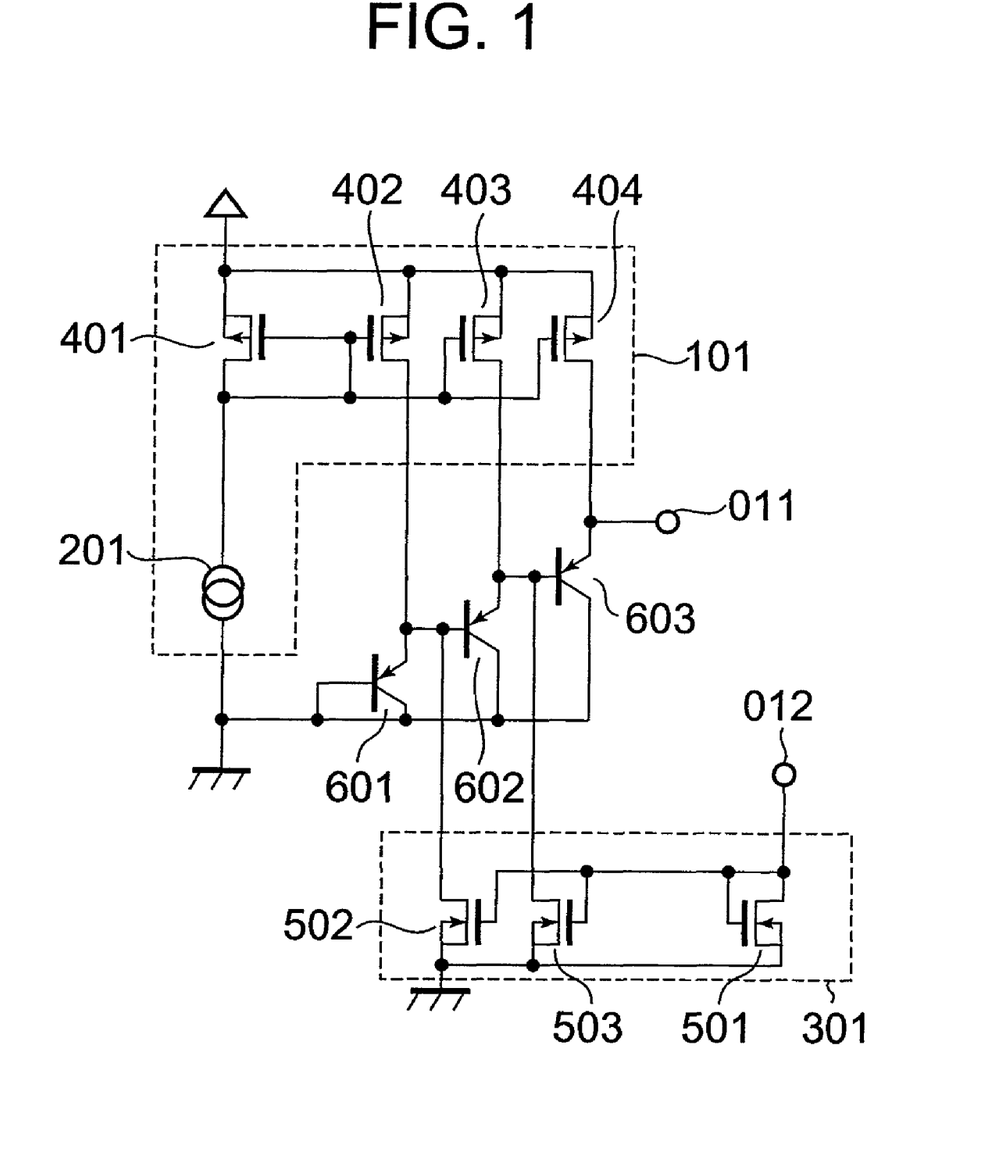
FIG. 1 is a schematic diagram showing a temperature sensor circuit according to a first embodiment of the present invention.

A temperature sensor circuit according to a first embodiment will be described. FIG. 1 is a schematic diagram showing the temperature sensor circuit according to the first embodiment.

The temperature sensor circuit includes a constant current circuit 101, a Darlington circuit, and a current control circuit 301. The constant current circuit 101 includes a constant current source 201 and a first current mirror circuit composed of MOS transistors 401 to 404 having the same size. The Darlington circuit includes bipolar transistors 601 to 603 having the same size. Drains of the MOS transistors 402 to 404 of the constant current circuit 101 are connected with corresponding emitters of bipolar transistors 601 to 603 of the Darlington circuit. The current control circuit 301 includes a second current mirror circuit composed of MOS transistors 501 to 503. The MOS transistors 502 and 503 of the current control circuit 301 are connected with corresponding bases of the bipolar transistors 602 and 603 of the Darlington circuit.

Next, the operation of the temperature sensor circuit will be described.

A current Ia is supplied from the constant current source 201 and flows as a drain current (Ia) through the MOS transistor 401. With the employment of the first current mirror circuit, the drain current Ia flows into the bipolar transistor 601 to 603 through the MOS transistors 402 to 404, thereby performing current supply. Base currents Ib601 to Ib603 corresponding to emitter currents Ia flow from the bipolar transistors 601 to 603. The base currents Ib602 and Ib603 flow as drain currents into the MOS transistors 502 and 503 of the current control circuit 301 and are sunk thereby. A current value of each of the currents sunk by the MOS transistors 502 and 503 is equal to a current value of a current supplied from an input terminal 012. The current value of the current supplied from the input terminal 012 is set such that the base currents of the bipolar transistors 602 and 603 can be sunk.

Base-emitter voltages of the bipolar transistors 601 to 603 vary with a temperature and an output voltage from an output terminal 011 of the temperature sensor circuit also varies correspondingly. The temperature is detected based on the output voltage.

According to the temperature sensor circuit, the base currents Ib602 and Ib603 are sunk by the current control circuit 301. Therefore, the base currents Ib602 and Ib603 do not flow into the corresponding emitters of the bipolar transistors 601 and 602, so all the emitter currents of the bipolar transistors 601 to 603 are equal to one another and become Ia. Thus, variations in base-emitter voltages of the bipolar transistors 601 to 603 are suppressed, with the result that the precision of the output voltage of the temperature sensor circuit becomes higher.

The MOS transistors 401 to 404 of the first current mirror circuit are equal in size to one another, so the drain currents flowing through the MOS transistors 401 to 404 are equal to one another. However, the MOS transistors 401 to 404 may be different in size from one another. In this case, when the currents sunk by the current control circuit 301 are adjusted, the emitter currents flowing through the bipolar transistors 601 to 603 of the Darlington circuit become equal to one another.

The MOS transistors 501 to 503 of the second current mirror circuit are equal in size to one another, so the drain currents flowing through the MOS transistors 501 to 503 are equal to one another. However, the MOS transistors 501 to 503 may be different in size from one another. In this case, when the currents supplied from the constant current circuit 101 are adjusted, the emitter currents flowing through the bipolar transistors 601 to 603 of the Darlington circuit become equal to one another.

The bipolar transistors 601 to 603 of the Darlington circuit are equal in size to one another, so the emitter currents flowing through the bipolar transistors 601 to 603 are equal to one another. However, the bipolar transistors 601 to 603 may be different in size from one another. In this case, when the currents sunk by the current control circuit 301 and the currents supplied from the constant current circuit 101 are adjusted, the emitter currents flowing through the bipolar transistors 601 to 603 of the Darlington circuit become equal to one another.

The Darlington circuit has a three-stage structure. For example, a four-stage structure may be employed. In this case, the constant current circuit 101 and the current control circuit 301 are changed according to the number of stages of the Darlington circuit.

The Darlington circuit is composed of PNP bipolar transistors. NPN bipolar transistors may be provided. In this case, the current control circuit 301 does not adjust the sunk current but sources base currents of the NPN bipolar transistors.

For example, assume that the base currents of the bipolar transistors of the Darlington circuit have temperature characteristics. In this case, a table in which current values of the base currents are associated with temperatures may be provided in advance and a current corresponding to a temperature which is determined based on the table may be supplied to the input terminal 012.

Second Embodiment

Figure 2:
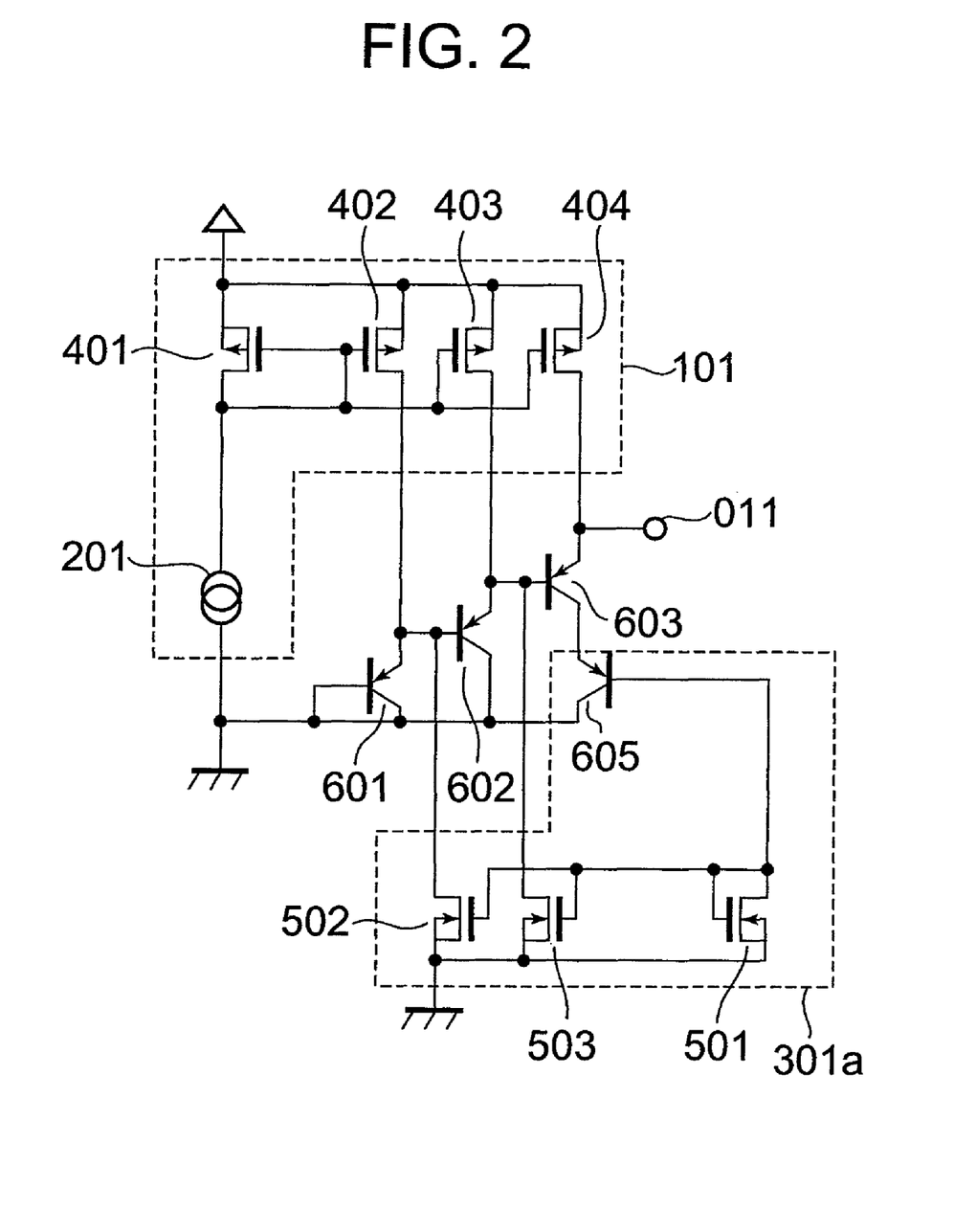
FIG. 2 is a schematic diagram showing a temperature sensor circuit according to a second embodiment of the present invention.

Next, a temperature sensor circuit according to a second embodiment will be described. FIG. 2 is a schematic diagram showing the temperature sensor circuit according to the second embodiment.

The temperature sensor circuit according to the second embodiment is different from the temperature sensor circuit according to the first embodiment in that the input terminal 012 is omitted and a bipolar transistor 605 equal in size to the bipolar transistor 603 is added to the current control circuit 301 to provide a current control circuit 301a.

A collector of the bipolar transistor 603 is connected with an emitter of the bipolar transistor 605. A base of the bipolar transistor 605 is connected with a drain of the MOS transistor 501.

Unlike the first embodiment, the current is not supplied from the input terminal 012 to the MOS transistor 501. The emitter current of the bipolar transistor 603 is substantially equal to an emitter current of the bipolar transistor 605. The bipolar transistor 603 is equal in size to the bipolar transistor 605. Therefore, a current whose current value is substantially equal to that of the base current Ib603 of the bipolar transistor 603 is supplied to the MOS transistor 501.

According to the temperature sensor circuit, a base current Ib605 of the bipolar transistor 605 flows as a drain current into the MOS transistor 501. With the employment of the current mirror circuit, the base current Ib605 is sunk from the base of the bipolar transistor 603 to a drain of the MOS transistor 503. The base current Ib605 is substantially equal to the base current Ib603, so almost all the base current Ib603 of the bipolar transistor 603 is sunk. Similarly, almost all the base current Ib602 of the bipolar transistor 602 is sunk.

Third Embodiment

Figure 3:
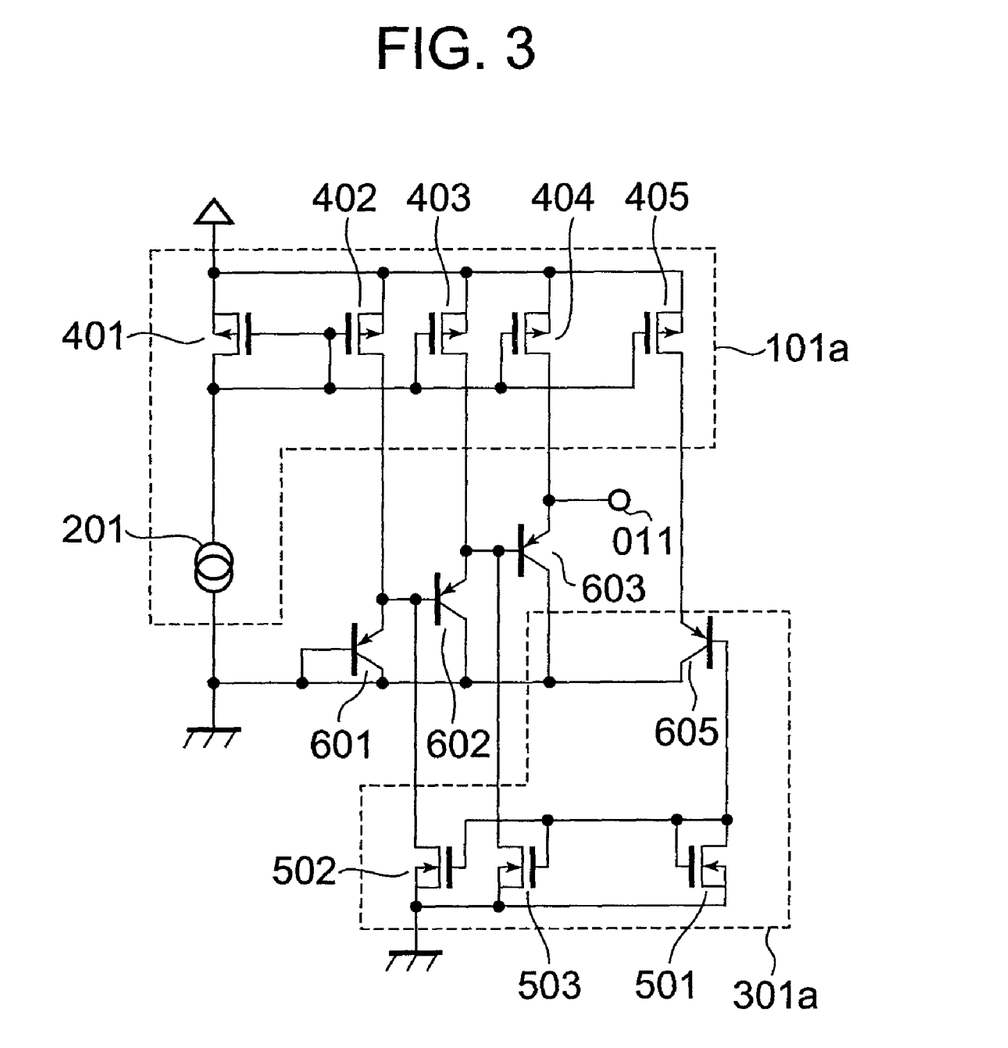
FIG. 3 is a schematic diagram showing a temperature sensor circuit according to a third embodiment of the present invention.

Next, a temperature sensor circuit according to a third embodiment will be described. FIG. 3 is a schematic diagram showing the temperature sensor circuit according to the third embodiment.

The temperature sensor circuit according to the third embodiment is different from the temperature sensor circuit according to the second embodiment in that a MOS transistor 405 equal in size to the MOS transistors 401 to 404 is added to the constant current circuit 101 to provide a constant current circuit 101a.

A drain of the MOS transistor 405 is connected with the emitter of the bipolar transistor 605. The base of the bipolar transistor 605 is connected with the drain of the MOS transistor 501.

With the employment of the current mirror circuit, the drain current of the MOS transistor 404 is equal to a drain current of the MOS transistor 405, so a current whose current value is substantially equal to that of the base current Ib603 of the bipolar transistor 603 is supplied to the MOS transistor 501.

Fourth Embodiment

Figure 4:
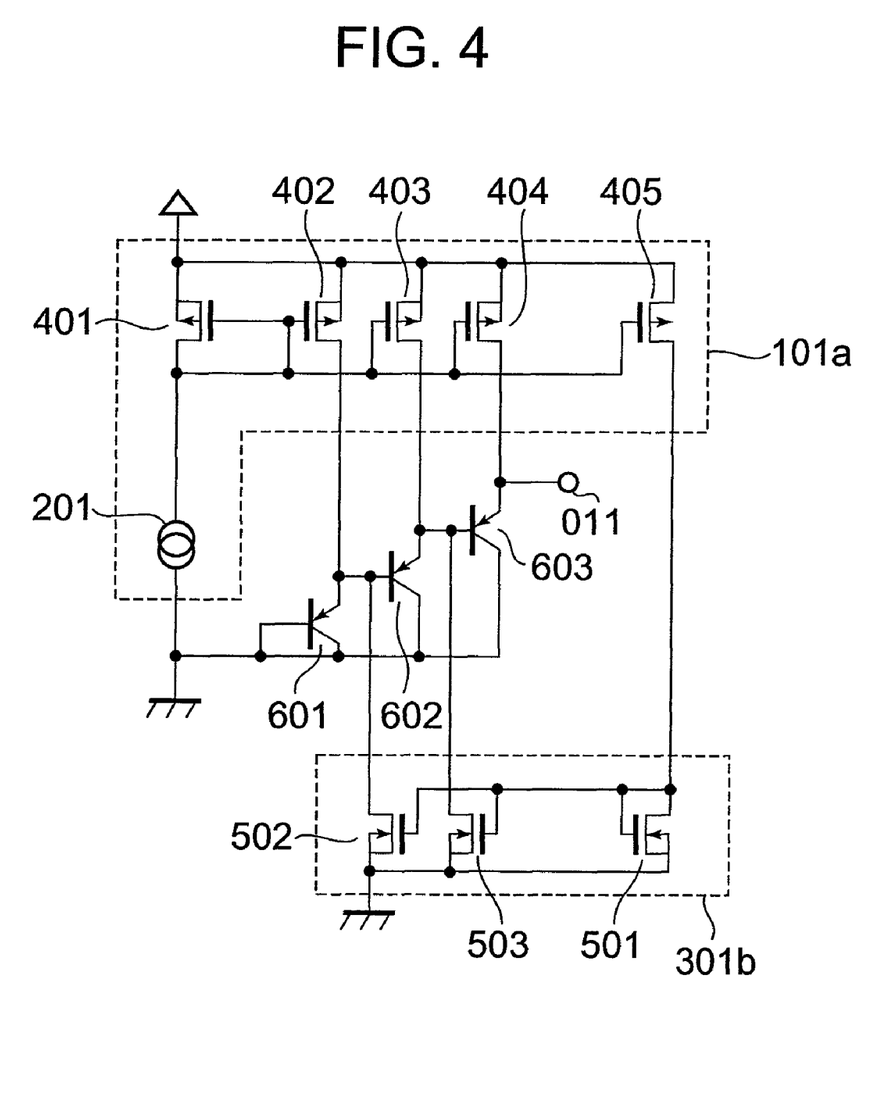
FIG. 4 is a schematic diagram showing a temperature sensor circuit according to a fourth embodiment of the present invention.

Next, a temperature sensor circuit according to a fourth embodiment will be described. FIG. 4 is a schematic diagram showing the temperature sensor circuit according to the fourth embodiment.

The temperature sensor circuit according to the fourth embodiment is different from the temperature sensor circuit according to the first embodiment in the following points. The input terminal 012 is omitted. The MOS transistor 405 equal in size to the MOS transistors 401 to 404 is added to the constant current circuit 101 to provide the constant current circuit 101a. In a current control circuit 301b, the MOS transistor 501 is different in size from the MOS transistors 502 and 503.

The drain of the MOS transistor 405 is connected with the drain of the MOS transistor 501.

Unlike the first embodiment, the current is not supplied from the input terminal 012 to the MOS transistor 501. With the employment of the current mirror circuit, the current Ia from the constant current source 201 is supplied to the MOS transistor 501.

According to the temperature sensor circuit, when a current value ratio between a base current and a drain current in a bipolar transistor is set to n:1 (n<1) and a size ratio among the MOS transistor 502, the MOS transistor 503, and the MOS transistor 501 is set to n:n:1, the drain current Ia of the MOS transistor 405 flows as a drain current into the MOS transistor 501. With the employment of the current mirror circuit, a current which is n times larger than the drain current Ia is sunk from the base of the bipolar transistor 603 to the drain of the MOS transistor 503. The current which is n times larger than the drain current Ia is substantially equal to the base current Ib603, so almost all the base current Ib603 of the bipolar transistor 603 is sunk. Similarly, almost all the base current Ib602 of the bipolar transistor 602 is sunk.

Fifth Embodiment

Figure 5:
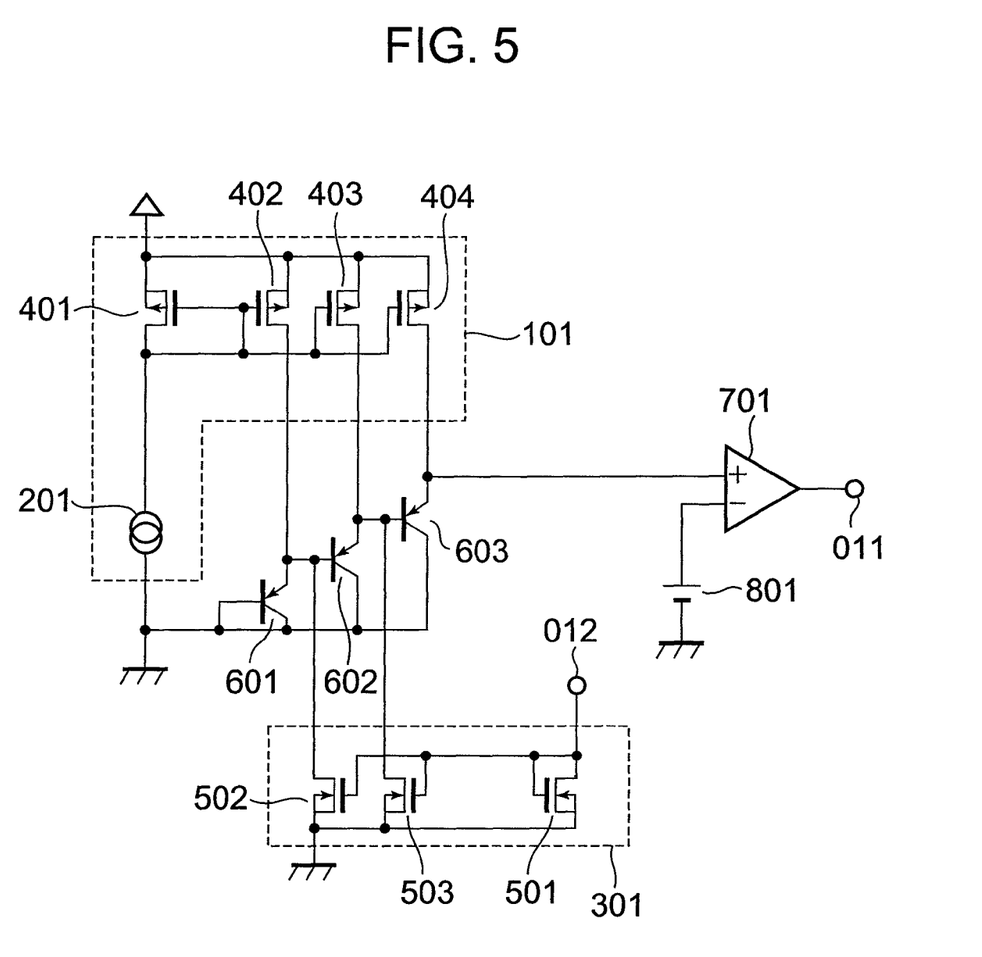
FIG. 5 is a schematic diagram showing a temperature sensor circuit according to a fifth embodiment of the present invention.

Next, a temperature sensor circuit according to a fifth embodiment will be described. FIG. 5 is a schematic diagram showing the temperature sensor circuit according to the fifth embodiment.

The temperature sensor circuit according to the fifth embodiment is different from the temperature sensor circuit according to the first embodiment in that a comparison circuit 701 and a reference voltage source 801 are further provided.

The output terminal of the temperature sensor circuit according to the first embodiment is connected with one input terminal of the comparison circuit 701. The reference voltage source 801 is connected with the other input terminal of the comparison circuit 701.

According to the temperature sensor circuit, the comparison circuit 701 generates an electrical signal based on a relationship between the output voltage of the temperature sensor circuit according to the first embodiment and a voltage of the reference voltage source 801. A temperature characteristic of the output voltage of the temperature sensor circuit according to the first embodiment is determined in advance and a voltage value of the reference voltage source 801 is made equal to an output voltage value at a set temperature. The comparison circuit 701 compares an output voltage value with the voltage value of the reference voltage source 801 and generates a high-precision electrical signal indicating that a temperature based on the output voltage value is equal to or higher than the set temperature or that the temperature is lower than the set temperature.

What is claimed is:

1. A temperature sensor circuit, comprising:
    a Darlington circuit including a plurality of transistors, wherein base-emitter voltages of the plurality of transistors vary with temperature;
    an output terminal connected with the Darlington circuit, wherein the output terminal provides a varying output voltage that varies as the base-emitter voltages of the plurality of transistors vary;
    a constant current circuit connected to the Darlington circuit and configured to supply a current to the Darlington circuit; and
    a current control circuit comprising a current mirror circuit connected to the Darlington circuit and configured prevent a base current of one of the plurality of transistors from flowing into an emitter of an adjacent transistor of the Darlington circuit in order to cause emitter currents of the plurality of transistors to be equal to each other, wherein a temperature is detected based on the output voltage.

2. The temperature sensor circuit according to claim 1, wherein the current mirror circuit comprises a plurality of MOS transistors, each of which comprising a drain connected between an emitter and base of adjacent transistors of the Darlington circuit.

3. The temperature sensor circuit according to claim 2, wherein the current mirror circuit receives a current from the Darlington circuit as an input current.

4. The temperature sensor circuit according to claim 2, wherein the current mirror circuit receives a current from the constant current circuit as an input current.

5. The temperature sensor circuit according to claim 4, wherein the current mirror circuit receives a current equal to the current supplied from the constant current circuit as an input current.

6. The temperature sensor circuit according to claim 1, further comprising:
    a reference voltage source that supplies a reference voltage; and
    a comparison circuit configured to compare the output voltage from the Darlington circuit with the reference voltage and to generate a signal based on a result obtained by the comparison.

7. The temperature sensor circuit according to claim 6, wherein the reference voltage is equal to a voltage that corresponds to a pre-determined temperature.

8. The temperature sensor circuit according to claim 7, wherein the signal indicates whether the temperature is greater than or equal to the pre-determined temperature.

9. The temperature sensor circuit according to claim 7, wherein the signal indicates whether the temperature is less than or equal to the pre-determined temperature.

* * * * *